United States Patent
Maeda

(10) Patent No.: US 9,472,931 B2
(45) Date of Patent: Oct. 18, 2016

(54) SEAL STRUCTURE FOR WIRE HARNESS

(71) Applicant: SUMITOMO WIRING SYSTEMS, LTD., Mie (JP)

(72) Inventor: Takamasa Maeda, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/883,851

(22) Filed: Oct. 15, 2015

(65) Prior Publication Data

US 2016/0126709 A1     May 5, 2016

(30) Foreign Application Priority Data

Nov. 5, 2014   (JP) .................. 2014-225329

(51) Int. Cl.
*H02G 3/04* (2006.01)
*B60R 16/02* (2006.01)
*H02G 3/06* (2006.01)

(52) U.S. Cl.
CPC ......... *H02G 3/0462* (2013.01); *B60R 16/0215* (2013.01); *B60R 16/0222* (2013.01); *H02G 3/0406* (2013.01); *H02G 3/0691* (2013.01)

(58) Field of Classification Search
USPC ...................................................... 174/72 A
See application file for complete search history.

(56) References Cited

U.S. PATENT DOCUMENTS

| 3,750,444 | A | * | 8/1973 | Bittner | B21D 15/04 29/890.048 |
| 5,297,586 | A | * | 3/1994 | McIntosh | F16L 33/26 138/109 |
| 5,767,448 | A | * | 6/1998 | Dong | H05B 3/56 174/74 A |

FOREIGN PATENT DOCUMENTS

JP        2006-311699       11/2006

* cited by examiner

*Primary Examiner* — Dhirubhai R Patel
(74) *Attorney, Agent, or Firm* — Greenblum & Bernstein, P.L.C.

(57) ABSTRACT

Sealing ability with respect to a shield pipe is ensured. A wire harness is inserted in the inside of a shield pipe and a braid portion, and furthermore, a corrugated tube is disposed on the outer side of the braid portion. A sealing grommet is disposed to extend across a connecting portion between the shield pipe and the braid portion. A seal member made of rubber is pushed into an end portion of the shield pipe. A wire insertion hole in which a conductive wire of the wire harness is inserted penetrates the seal member, and a wire insertion path is formed in an outer circumferential surface of the seal member toward the wire insertion hole. Thus, the conductive wire can be inserted into the wire insertion hole from a radial direction.

4 Claims, 7 Drawing Sheets

SEAL STRUCTURE FOR WIRE HARNESS

TECHNICAL FIELD

The present invention relates to a seal structure for a wire harness.

BACKGROUND ART

Conventionally, in hybrid vehicles or electric automobiles, there are cases where a wire harness constituted by a plurality of wires is routed between a battery and an inverter in a state in which the wire harness is inserted in a metal shield pipe. An example of such a wire harness is disclosed in JP 2006-311699A.

In the case of the aforementioned wire harness, the shield pipe is routed along an under-floor area of a vehicle. On the other hand, in a portion of the wires that is led out of the shield pipe, that is, in a region where the wires are routed toward the battery or the inverter, the wires are inserted in a flexible metal braid portion and are able to be routed freely. Moreover, conventionally, the metal braid portion is inserted in a corrugated tube for the purpose of waterproofing and the like, and furthermore, the shield pipe and the corrugated tube are connected to each other by a waterproof grommet.

JP 2006-311699A is an example of related art.

However, with respect to the above-described structure, there is a concern that if the corrugated tube is damaged, and a break or the like occurs therein, water entering the inside of the corrugated tube from this break or the like may reach the inside of the shield pipe and cause rust in the pipe. To address this issue, it is conceivable that a rubber stopper in which the wire harness is inserted in a sealed state is provided in the shield pipe. Such a rubber stopper has wire insertion holes extending in an axial direction. However, even when such a rubber stopper is provided in the shield pipe, the operation of inserting the conductive wires constituting the wire harness into the wire insertion holes in the axial direction is burdensome and is by no means preferable in terms of working efficiency.

SUMMARY OF THE INVENTION

The present invention was made based on circumstances such as those described above, and it is an object thereof to provide a seal structure for a wire harness that can maintain the sealing ability with respect to a shield pipe and that can facilitate the operation of inserting conductive wires into a seal member.

A seal structure for a wire harness of the present invention includes a shield pipe in which a conductive wire constituting a wire harness is inserted, a tube-shaped flexible shield member that is connected to an end portion of the shield pipe and in which the conductive wire extended out of the shield pipe is inserted, a protective member that surrounds the flexible shield member in a lengthwise direction, a sealing grommet that is disposed to extend between the shield pipe and the protective member while surrounding the flexible shield member, and a seal member that is fitted inside the shield pipe in a watertight state and that is composed of an elastic material in which a wire insertion hole in which the conductive wire can be inserted in a watertight state is formed penetrating the elastic material in an axial direction of the shield pipe, wherein a wire insertion path is formed in an outer circumferential surface of the seal member over the entire length thereof, the wire insertion path being formed toward the wire insertion hole and enabling the conductive wire to be introduced into the wire insertion hole in a radial direction, the wire insertion path elastically deforms in an opening direction during the introduction of the conductive wire, and in a state in which the conductive wire is introduced into the wire insertion hole, and the seal member is fitted in the shield pipe, at least a protective member-side end portion of the seal member is closed and kept watertight.

According to the present invention, even if the protective member is damaged, and water enters the inside of the flexible shield member, the entry of water to the inside of the shield pipe is prevented by the seal member. Moreover, the conductive wire can be introduced into the wire insertion hole along the wire insertion path, that is, from the radial direction with respect to the wire insertion hole. Accordingly, this operation can be performed easily and smoothly when compared with an operation of inserting the conductive wire into the wire insertion hole from the axial direction. Also, even though this wire insertion path is formed, the sealing ability is not compromised because in a state in which the seal member is fitted in the shield pipe, the wire insertion path is kept watertight with at least an end surface thereof on the protective member side being closed.

EMBODIMENTS OF THE INVENTION

The following is a description of preferred modes of the present invention.

(1) In the seal structure for a wire harness according to the present invention, a flange that covers an end edge of the shield pipe may also be formed projecting outward from the seal member.

With this configuration, in a state in which the seal member is attached to the shield pipe, the flange is in a state in which it covers the end edge of the shield pipe. Accordingly, even if the end edge of the shield pipe is a sharp edge, the conductive wire is not damaged by the end edge of the shield pipe. That is to say, the seal member can also serve as a wire protective member for protecting the conductive wire against damage.

(2) Moreover, the wire insertion path may also be formed undulating in a substantially wavy line shape with respect to an axial direction of the seal member.

With this configuration, the overall length of the wire insertion path can be increased when compared with a case where the wire insertion path is formed into a straight line shape. That is to say, a labyrinth function can be imparted to the wire insertion path, and thus the waterproof function of the seal member can be improved.

Next, embodiments of the seal structure for a wire harness according to the present invention will be described with reference to the drawings.

Embodiment 1

A seal structure for a wire harness of Embodiment 1 is applied to a hybrid vehicle.

Figure 1:
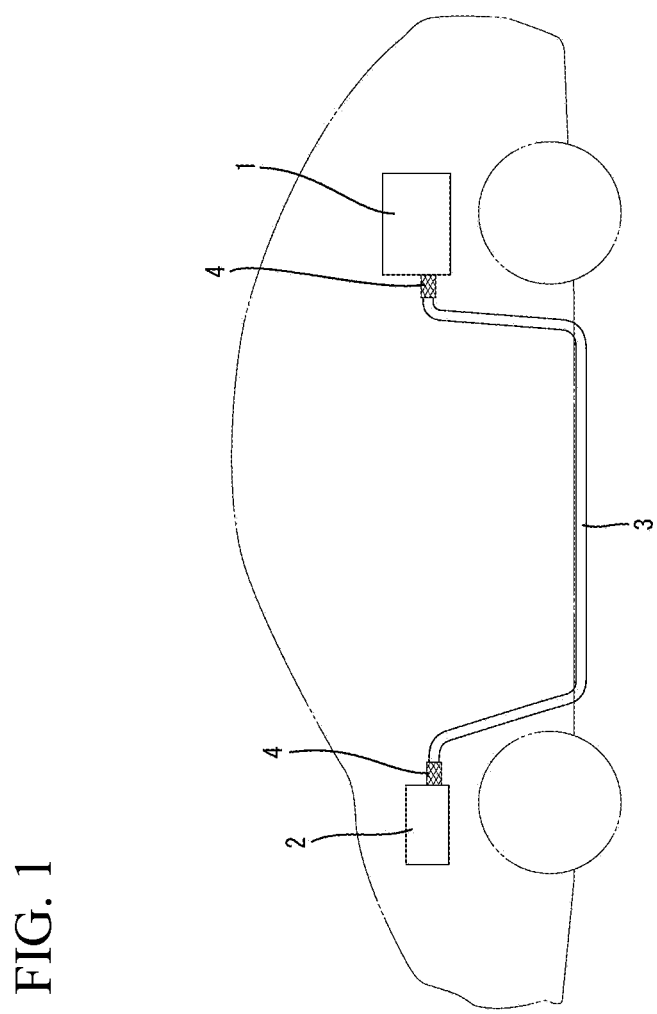
FIG. 1 is a side view briefly showing a situation in which, in a hybrid vehicle, a battery and an inverter are connected to each other via a wire harness.
Figure 2:
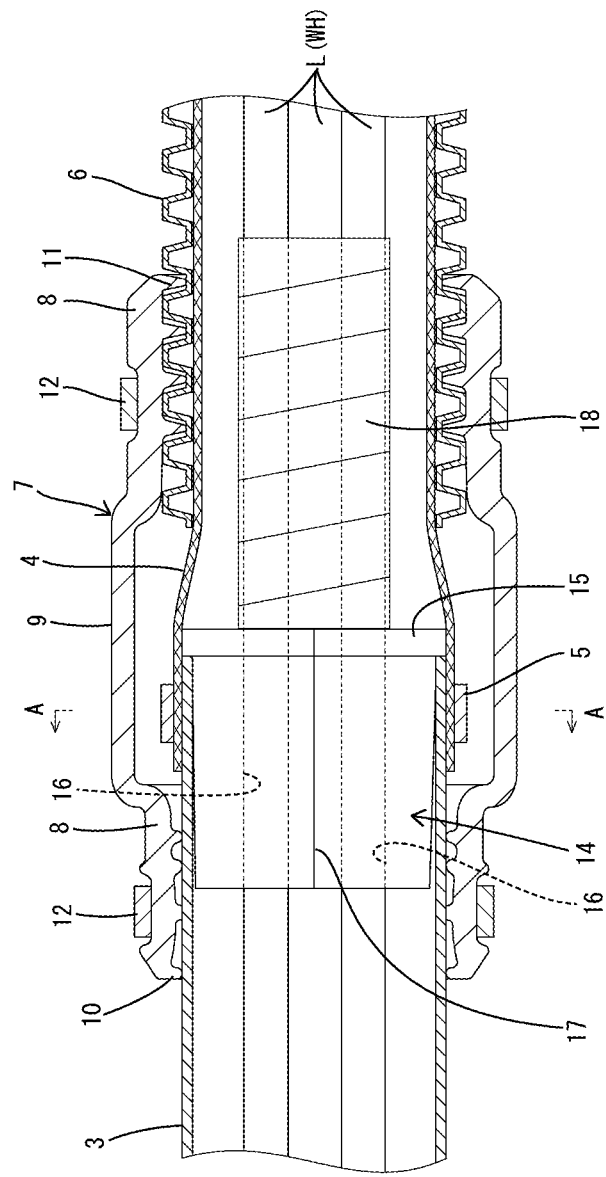
FIG. 2 is a side cross-sectional view showing a connecting portion between a shield pipe and a braid portion.

A wire harness WH connects a battery 1 that is installed on a rear side of the vehicle and an inverter 2 that is provided in an engine compartment to each other. In the case of the present embodiment, as shown in FIG. 2, the wire harness WH is constituted by three flexible conductive wires L.

An intermediate portion of the wire harness WH is collectively inserted in a shield pipe 3 that is disposed in an under-floor area of the vehicle. The shield pipe 3 is made of aluminum or an aluminum alloy and is composed of an elongated pipe having a circular cross-sectional shape. The shield pipe 3 is bent to be routed along a predetermined pipe arrangement route. The shield pipe 3 generally extends horizontally in a substantially front-rear direction of the vehicle. A front end side of the shield pipe 3 is bent upward to be introduced into the engine compartment, and a rear end side thereof is introduced into a rear side of a cabin.

Figure 3:
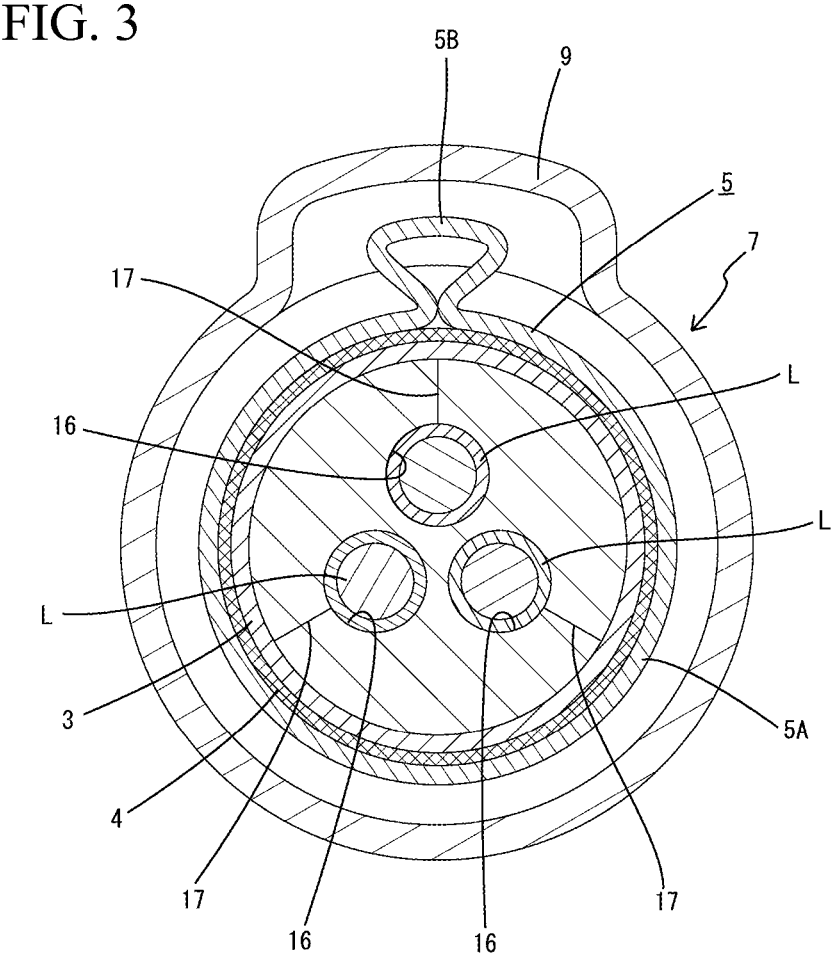
FIG. 3 is a cross-sectional view taken along line A-A in FIG. 2.

The wire harness WH is led out from opposite end portions of the shield pipe 3 with respect to a longitudinal direction thereof. Those portions of the wire harness WH that are led out of the shield pipe 3 are inserted in respective braid portions 4 (flexible shield members). The braid portions 4 are formed by interweaving multiple conductive metal strands into a tube shape, and each have favorable flexibility as a whole. An end portion of each of the two braid portions 4 that is located on the shield pipe 3 side is placed to cover an outer circumferential surface of the corresponding end portion of the shield pipe 3 and is tightened and fixed thereto using a crimp ring 5 made of metal. The braid portion 4 is thus connected to the shield pipe 3. As shown in FIG. 3, the crimp ring 5 is composed of an annular ring-shaped main body portion 5A and a crimp operating portion 5B protruding radially outward from the main body portion 5A. Before crimping, the crimp operating portion 5B extends upright in the radially outward direction from the main body portion 5A and has an almost constant width. The braid portion 4 can be tightened and fixed to the shield pipe 3 by reducing the diameter of the main body portion 5A by deforming the crimp operating portion 5B in such a manner that base portions thereof are brought close to each other.

Moreover, a corrugated tube 6 serving as a protective member is disposed on the outer circumferential side of the braid portion 4.

As shown in FIG. 2, an end portion of the corrugated tube 6 is located at a predetermined distance from the end portion of the shield pipe 3 in a lengthwise direction. The corrugated tube 6 is made of a synthetic resin and is formed into a tube shape that is continuous around the entire circumference. The corrugated tube 6 is formed into an accordion tube shape having alternate ridges and grooves in its lengthwise direction, and has favorable flexibility.

As shown in FIG. 2, a sealing grommet 7 bridges between the corrugated tube 6 and the shield pipe 3. The grommet 7 is formed of a rubber material. Cylindrical tube portions 8 are formed at both end portions of the grommet 7. In order to avoid a portion between the two tube portions 8 interfering with the crimp operating portion 5B of the above-described crimp ring 5, an internal space of that portion is expanded to form an accommodating portion 9. One of the tube portions 8 (tube portion on the left side in FIG. 2) of the grommet 7 is fitted to the outer circumferential surface of the end portion of the shield pipe 3, and the other tube portion 8 (tube portion on the right side in FIG. 2) is fitted to the outer circumferential surface of the end portion of the corrugated tube 6. A plurality of seal lips 10 are formed protruding from an inner circumferential surface of the tube portion 8 on the shield pipe 3 side and extending around the entire circumference. In the present embodiment, a total of four seal lips 10 are formed respectively in a position at a leading end of this tube portion 8 and in three other positions that are located farther inward. A plurality of seal edges 11 are formed protruding from an inner circumferential surface of the tube portion 8 on the corrugated tube 6 side and extending around the entire circumference. In the present embodiment, a total of four seal edges 11 are formed respectively in a position at a leading end of this tube portion 8 and in three other positions that are located farther inward. The seal edges 11 are formed with the same pitch as that of the grooves of the corrugated tube 6 and can be inserted into the corresponding grooves.

Cable ties 12 are disposed on the outer circumferential surfaces of both of the two tube portions 8 of the grommet 7. Since the cable ties 12 are known cable ties made of resin, a detailed description thereof is omitted. The grommet 7 can be connected to the shield pipe 3 or the corrugated tube 6 by tightening the corresponding cable tie 12. Moreover, at this time, the tightening force of the cable tie 12 acts on the seal lips 10 or the seal edges 11 to bring them into elastic contact with the shield pipe 3 or the corrugated tube 6, and thus the sealed state is enhanced.

As shown in FIG. 2, seal members 14 made of rubber are attached to an intermediate portion of the wire harness WH and are fitted in the opposite end portions of the shield pipe 3. A flange 15 is formed on a circumferential edge of one end of each seal member 14 with respect to the axial direction, projecting radially outward therefrom. The flange 15 is configured such that when the seal member 14 is fitted in the corresponding end portion of the shield pipe 3, the flange 15 conceals an end edge of the shield pipe 3 while abutting against this end edge. Thus, even if both of the end edges of the shield pipe 3 are sharp edges, damage to coatings of the conductive wires L can be avoided in advance.

Figure 4:
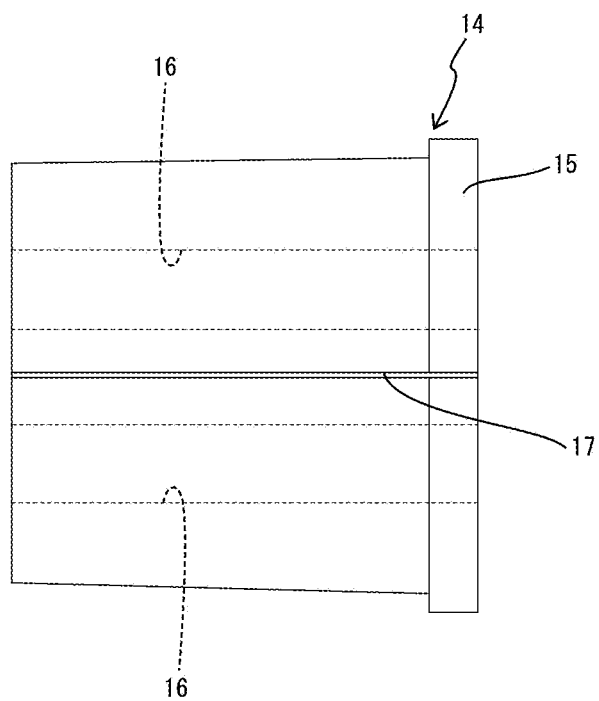
FIG. 4 is a side view of a seal member.

As shown in FIGS. 2 and 4, the seal member 14 is formed into a tapered shape that tapers toward a side opposite to the side on which the flange 15 is formed, so that the seal member 14 can be smoothly pushed into the shield pipe 3. It should be noted that when the seal member 14 is in a natural state, the maximum diameter of a portion of the seal member 14 excluding the flange 15 is slightly larger than the inner diameter of the shield pipe 3. Accordingly, when the seal member 14 is pushed into the shield pipe 3 in a press-fitted state, the outer circumferential surface of the seal member 14 can come into close contact with the inner circumferential surface of the shield pipe 3 in a watertight state. It should be noted that the "natural state" above refers to a state in which the seal member 14 is not pushed into the shield pipe 3, that is, no external force is applied to the seal member 14.

Also, as shown in FIGS. 3 and 4, three wire insertion holes 16 corresponding to the respective conductive wires L are provided in the seal member 14. The wire insertion holes 16 are formed penetrating the seal member 14 in the axial direction thereof. In the cross-sectional view shown in FIG. 3, the wire insertion holes 16 are arranged coaxially with the seal member 14. Each wire insertion hole 16 is formed to have a hole diameter that enables the conductive wire L to be inserted therein. In addition, although not shown in detail, sealing lips are formed on the inner circumference of the wire insertion hole 16. The sealing lips are formed extending along the entire circumference of the wire insertion hole 16 and protruding radially inward, and are provided at a plurality of positions that are arranged at appropriate intervals in the axial direction of the wire insertion hole 16.

As shown in FIG. 3, three wire insertion paths 17 for introducing the conductive wires L toward the respective wire insertion holes 16 are formed in the seal member 14. Each wire insertion path 17 is cut into the outer circumferential surface of the seal member 14 along the radial direction toward the center of the wire insertion hole 16. As a result, as shown in FIG. 3, the wire insertion paths 17 extend radially with respect to the center of the seal member 14. Moreover, as shown in FIG. 4, each wire insertion path 17 of the present embodiment is formed into a straight line shape along the axial direction over the entire length of the seal member 14. In the natural state, the wire insertion paths 17 are substantially closed and are elastically deformable in an opening direction, whereas, in a state in which the seal member 14 is pushed into the shield pipe 3, and the overall diameter of the seal member 14 is thus reduced, the wire insertion paths 17 are closed in a watertight state (the state shown in FIGS. 2 and 3).

It should be noted that as shown in FIG. 2, portions of the respective conductive wires L that project from the seal member 14 into the braid portion 4 are bound together, and tape 18 is wrapped around those portions over a predetermined length range. Thus, even when the braid portion 4 side of the wire harness WH is bent while the wire harness WH is routed, the bend is unlikely to affect the seal member 14.

Next, effects of the present embodiment that is configured as described above will be described. First, an example of the operation of forming a seal structure with respect to the wire harness WH will be described. After the wire harness WH is inserted in the shield pipe 3, the operation of attaching the seal member 14 is performed. In that case, each of the conductive wires L is inserted into the corresponding wire insertion path 17 from the radial direction while widening the wire insertion path 17 over the entire length thereof, and is then pushed into the corresponding wire insertion hole 16. Thus, the conductive wires L are inserted in the respective wire insertion holes 16. In this state, the seal member 14 is aligned with the corresponding end portion of the shield pipe 3 and pushed therein until the flange 15 abuts against the end edge of the shield pipe 3. As a result, the outer circumferential surface of the seal member 14 comes into close contact with the inner circumferential surface of the shield pipe 3, and the wire insertion paths 17 are closed in a watertight state.

Next, the corrugated tube 6 is disposed on the outer circumferential side of the braid portion 4, and an end portion of the braid portion 4 is made to protrude from an end portion of the corrugated tube 6 in advance. On the other hand, the grommet 7 is externally put on the shield pipe 3 or the corrugated tube 6 and is held backward on standby. In this state, the end portion of the braid portion 4 is crimped onto the shield pipe 3 using the crimp ring 5. After that, the grommet 7 is displaced so that the crimp ring 5 is accommodated in the accommodating portion 9, and one of the tube portions is fitted to the shield pipe 3, while the other of the tube portions is fitted to the corrugated tube 6. Then, the tube portion of the grommet 7 that is fitted to the shield pipe 3 is tightened using a cable tie, the other tube portion is fixed to the corrugated tube 6 by tightening a cable tie therearound. As a result, the grommet 7 is disposed to extend across a connecting portion between the shield pipe 3 and the corrugated tube 6 in a sealed state, and thus the operation is completed.

According to the present embodiment that is configured as described above, even if the corrugated tube 6 is damaged and water enters the inside thereof, the water cannot enter the inside of the shield pipe 3 past the seal member 14 because the path between the seal member 14 and the inner circumferential surface of the shield pipe 3, the path between each conductive wire L and the corresponding wire insertion hole 16, and the path for each wire insertion path 17 are all kept in a watertight state by the seal member 14. Therefore, the occurrence of a situation in which water accumulates inside the shield pipe 3 and causes rust can be reliably avoided.

Moreover, since the conductive wires L can be inserted into the seal member 14 from the radial direction via the respective wire insertion paths 17, the insertion operation can be performed easily and smoothly when compared with the operation of inserting the conductive wires L from the axial direction.

In addition, according to the present embodiment, since the seal members 14 are disposed in the end portions of the shield pipe 3, in each end opening of the shield pipe 3, the conductive wires L can be positioned substantially near the central portion. Furthermore, since the flanges 15 are formed so as to conceal the end edges of the shield pipe 3, the occurrence of a situation in which the conductive wires L are damaged by the end edges of the shield pipe 3, which may be sharp edges, can be reliably avoided. Moreover, although conventionally it has been necessary to attach wire protective members for covering the end edges of the shield pipe 3 to the shield pipe 3 in advance, the seal members 14 of the present embodiment have the functions of such wire protective members, and therefore even though the seal members 14 are added, the number of parts is not increased when compared with the conventional configuration.

Embodiment 2

Figure 5:
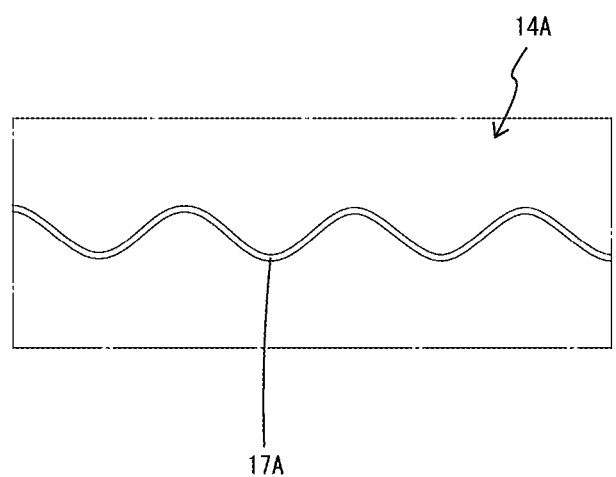
FIG. 5 is a side view showing a wire insertion path portion of a seal member according to Embodiment 2 in an enlarged manner.

FIG. 5 shows a seal member 14A according to Embodiment 2 of the present invention. In Embodiment 1, the wire insertion paths 17 of the seal members 14 are in the form of straight line-shaped cuts that are made along the axial direction, whereas wire insertion paths 17A of Embodiment 2 are in the form of wavy line-shaped cuts that are made along the axial direction to reach the corresponding wire insertion holes 16.

The thus formed seal members 14A allow the path length of the wire insertion paths 17A from an end surface on the leading end side to an end surface on the inward side, of each seal member 14A, to be increased and also allow the contact area between opposing surfaces of each wire insertion path 17A to be increased even more. Therefore, the entry of water to the inside of the shield pipe 3 can be more reliably prevented.

The other components are the same as those of Embodiment 1, and thus the same effects can be provided.

Embodiment 3

Figure 6:
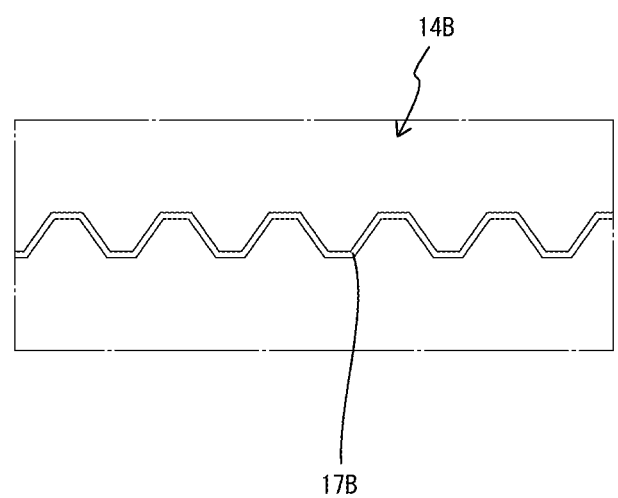
FIG. 6 is a side view showing a wire insertion path portion of a seal member according to Embodiment 3 in an enlarged manner.

FIG. 6 shows a seal member 14B according to Embodiment 3 of the present invention. In Embodiment 2, the wire insertion paths 17A in the form of wavy line-shaped cuts that are each composed of curved lines over the entire path in the axial direction are described. However, wire insertion paths 17B of Embodiment 3 are formed into the form of wavy line-shaped cuts that are each composed of straight lines over the entire path in the axial direction.

The thus configured Embodiment 3 also can provide the same effects as Embodiment 2.

Embodiment 4

Figure 7:
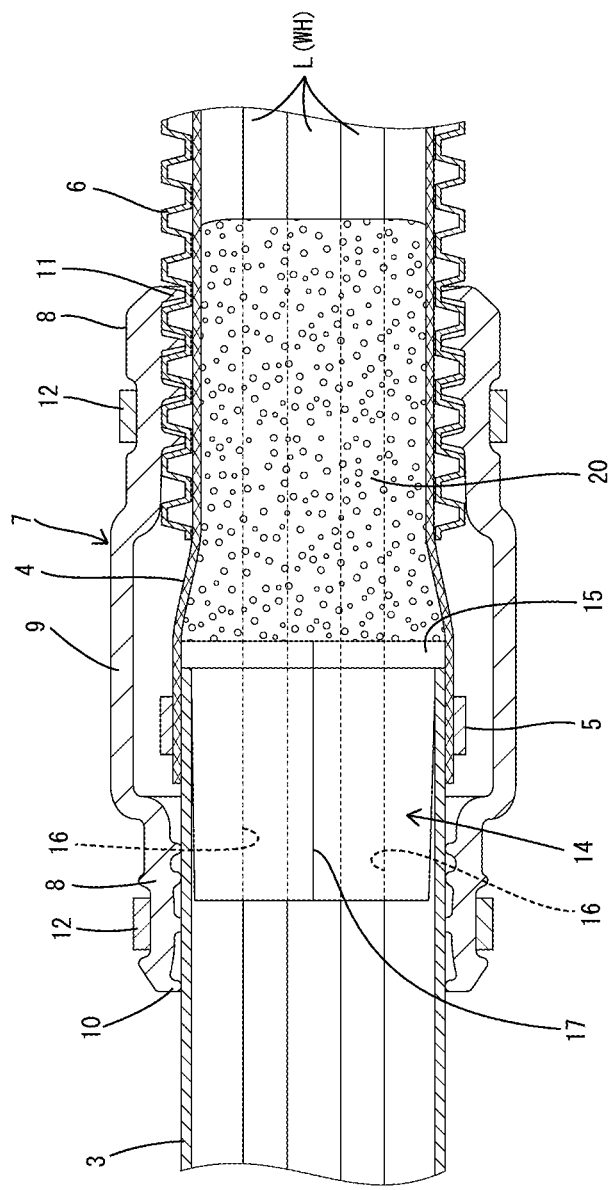
FIG. 7 is a side cross-sectional view showing a connecting portion between a shield pipe and a braid portion according to Embodiment 4.

FIG. 7 shows a seal structure according to Embodiment 4 of the present invention. In Embodiment 1, the tape 18 is wrapped around those portions of the conductive wires L that project beyond the seal members 14 into the braid portions 4. However, in Embodiment 4, a seal material 20 such as urethane resin foam, for example, is formed instead of or in addition to the tape 18. This seal material 20 can be formed by forming an injection hole (not shown) in the corrugated tube 6, passing a nozzle through the injection hole and, furthermore, through a mesh of the braid portion 4, and filling the inside of the braid portion 4 with a urethane resin foam agent.

The thus configured Embodiment 4 can enhance the sealing ability even more. It should be noted that the other components are the same as those of Embodiment 1 and are thus denoted by the same reference numerals to omit redundant descriptions.

Other Embodiments

The present invention is not limited to the foregoing embodiments that are described above with reference to the drawings. For example, embodiments such as those described below are also covered by the technical scope of the present invention.

(1) In the foregoing embodiments, the shield pipe 3 made of metal is described. However, the shield pipe 3 may be composed of a synthetic resin serving as the main ingredient, and a shield layer made of metal foil, for example, may be inserted inside the shield pipe 3 so as to provide a shielding function.

With this configuration, the diameter of the shield pipe 3 can be moderately reduced by tightening an end portion of the shield pipe 3. That is to say, in a configuration in which, like Embodiment 1, an area toward the end portion of each seal member 14 is tightened using the crimp ring 5, the extent of close contact with respect to the wire insertion paths 17 can be increased by deforming and reducing the seal member 14, and this can contribute to an improvement in the sealing ability even more.

(2) In the foregoing embodiments, the seal members 14 are disposed in the end portions of the shield pipe 3. Alternatively, the seal members 14 may be disposed in positions that are located inward of the respective end portions.

(3) In the foregoing embodiments, the corrugated tube 6 having an accordion tube shape is described as the protective member. However, the protective member can take any form as long as it has flexibility, and may also be in the form of an ordinary tube that is free from irregularities.

(4) In the foregoing embodiments, a braided wire is used as the flexible shield member. However, instead of the braided wire, the flexible shield member may also be formed by bending an aluminum sheet material, for example, into a tube shape.

What is claimed is:

1. A seal structure for a wire harness, the seal structure comprising:
   a shield pipe in which a conductive wire constituting a wire harness is inserted;
   a tube-shaped flexible shield member that is connected to an end portion of the shield pipe and in which the conductive wire extended out of the shield pipe is inserted;
   a protective member that surrounds the flexible shield member in a lengthwise direction;
   a sealing grommet that is disposed to extend between the shield pipe and the protective member while surrounding the flexible shield member; and
   a seal member that is fitted inside the shield pipe in a watertight condition and that is composed of an elastic material in which a wire insertion hole through which the conductive wire can be inserted in a watertight condition is formed penetrating the elastic material in an axial direction of the shield pipe,
   wherein a wire insertion path is formed in an outer circumferential surface of the seal member over the entire length thereof, the wire insertion path extending toward the wire insertion hole and enabling the conductive wire to be introduced into the wire insertion hole in a radial direction, the wire insertion path configured to elastically deform in an opening direction during the introduction of the conductive wire, and in a condition in which the conductive wire is introduced into the wire insertion hole, and the seal member is fitted in the shield pipe, at least a protective member-side end portion of the seal member is closed and kept watertight.

2. The seal structure for a wire harness according to claim 1,
   wherein a flange that covers an end edge of the shield pipe projects outward from the seal member.

3. The seal structure for a wire harness according to claim 2,
   wherein the wire insertion path undulates in a substantially wavy line shape with respect to the axial direction of the seal member.

4. The seal structure for a wire harness according to claim 1,
   wherein the wire insertion path undulates in a substantially wavy line shape with respect to the axial direction of the seal member.

* * * * *